(12) United States Patent
Pan et al.

(10) Patent No.: US 7,758,752 B2
(45) Date of Patent: Jul. 20, 2010

(54) COMPOSITE MATERIAL AND METHOD FOR REMOVING HARMFUL ALGAL BLOOMS AND TURNING THEM INTO SUBMERGED MACROPHYTES

(75) Inventors: Gang Pan, Beijing (CN); Binghui Tian, Beijing (CN); Hao Chen, Beijing (CN); Mulan Zhang, Beijing (CN); Xianzheng Yuan, Beijing (CN)

(73) Assignee: Research Center for Eco-Environmental Sciences, The Chinese Academy of Sciences, Beijing (CN)

( * ) Notice: Subject to any disclaimer, the term of this patent is extended or adjusted under 35 U.S.C. 154(b) by 138 days.

(21) Appl. No.: 12/065,818

(22) PCT Filed: Dec. 29, 2005

(86) PCT No.: PCT/CN2005/002363

§ 371 (c)(1),
(2), (4) Date: Sep. 5, 2008

(87) PCT Pub. No.: WO2007/028288

PCT Pub. Date: Mar. 15, 2007

(65) Prior Publication Data

US 2009/0107912 A1   Apr. 30, 2009

(30) Foreign Application Priority Data

Sep. 5, 2005   (CN) .................... 2005 1 0099736

(51) Int. Cl.
C02F 3/32 (2006.01)
C02F 1/52 (2006.01)
C02F 1/56 (2006.01)
A01G 31/00 (2006.01)

(52) U.S. Cl. .................. 210/602; 210/631; 210/906; 252/180

(58) Field of Classification Search .................. 210/602, 210/170.09, 170.1, 631, 906; 47/59 R; 252/180
See application file for complete search history.

(56) References Cited

U.S. PATENT DOCUMENTS 5,897,946 A * 4/1999 Nachtman et al. ........... 428/323

(Continued)

FOREIGN PATENT DOCUMENTS

CN   1417136   5/2003

(Continued)

OTHER PUBLICATIONS

International Search Report for International Application No. PCT/CN2005/002363 dated May 23, 2006.

*Primary Examiner*—Fred Prince
(74) *Attorney, Agent, or Firm*—RatnerPrestia

(57) ABSTRACT

The present invention proposes a composite material which can rapidly and effectively remove algae and transform them into submerged macrophytes. The composite material is a mixture of two functional materials: one can grow into submerged macrophytes, and the other is clays or modified local soil particles which can flocculate algae, inhibit phosphorus release from sediments and act as the carrier of the above-mentioned seeds, earthnuts, buds, and roots of submerged macrophytes. In addition, the present invention proposes a physical-chemical-ecological combined method for improving water quality and enhancing the ecological restoration of eutrophic lakes using the above-mentioned material. By spraying the composite material to the lake surface, the new method can remove algae and turbidity through flocculation and complete the planting process simultaneously so that HABs and eutrophication are effectively controlled.

12 Claims, 2 Drawing Sheets

U.S. PATENT DOCUMENTS 5,993,649 A * 11/1999 DeBusk et al. ................ 210/97
6,071,859 A   6/2000 Ogawa et al.

FOREIGN PATENT DOCUMENTS

| CN | 1418825 | 5/2003 |
| CN | 1426966 | 7/2003 |
| CN | 1480411 | 3/2004 |
| CN | 1530336 | 9/2004 |
| CN | 1541952 | 11/2004 |
| CN | 1590319 | 3/2005 |
| CN | 1597568 | 3/2005 |
| CN | 1602657 | 4/2005 |
| CN | 1623935 | 6/2005 |
| CN | 1686847 | 10/2005 |
| EP | 0870427 | 10/1998 |
| GB | 2337749 | 12/1999 |
| JP | 57048390 | 3/1982 |
| JP | 05101340 | 4/1993 |
| JP | 10334019 | 12/1998 |
| JP | 2003181485 | 7/2003 |
| WO | WO2007/028288 | 3/2007 |

* cited by examiner

COMPOSITE MATERIAL AND METHOD FOR REMOVING HARMFUL ALGAL BLOOMS AND TURNING THEM INTO SUBMERGED MACROPHYTES

TECHNICAL FIELD

This invention is related to a composite material for quickly removing harmful algal blooms, especially cyanobacterial blooms, and turning them into submerged macrophytes and a physical-chemical-ecological combined method for improving water quality and enhancing the ecological restoration of eutrophic lakes using the above-mentioned material.

BACKGROUND ART

Eutrophication of lakes has become a global environmental problem. Harmful algal blooms (HABs) often result in serious problems, such as ecological function destruction, unpleasant odors, and water deoxygenation. In addition, it may be harmful to domestic animals and human.

At present, the main methods in controlling eutrophication of lakes and restoring the ecological environment include: (1) point and non-point pollution controlling to reduce the nutrients loaded to the lakes; (2) constructing wetlands; (3) biomanipulation through feeding or capturing aquatic animals; (4) planting macrophytes; (5) controlling the water flow and level. The methods used in HABs and lake eutrophication control can be classified into three categories: physical methods, chemical methods and ecological methods. The physical methods include cutting off source of pollution, constructing retention basin, diluting, improving water level, circulating the water in lakes, dredging sediments, and collecting algae. However, these methods are all rather expensive. Chemical methods, including sewage dephosphorization, phosphorus-fixation, can often lead to secondary pollution. Ecological restoration has been widely studied for eutrophication control. For these methods, restoration of macrophytes is one of the most important methods to improve the water quality. Many methods have been made public as how to choose and combine the hydrophytes and how to plant these hydrophytes. However, the lack of clarity and transparency in HABs waters is the common limit for the successful restoration of submerged macrophytes. For natural waters, a transparency of 1.30 m~73 m, 0.73 m~40 m and 0.4 below Secchi disk transparence indicate eutrophication, moderate eutrophication and super-eutrophication, respectively. So, the first common problem to restore submerged macrophytes in the eutrophication lakes is the lack of methods that can effectively improve the water transparency at a very large scale, cost effectively, ecological safely, and high efficiently.

There are some hydrophytes restoration techniques in the eutrophication lakes, such as: planting vanguard hydrophytes and feeding zooplankton to improve the water clarity, constructing submerged macrophytes and emergent plant to improve the local water environment, adding oxidant (such as algaecide and fishacide) to improve the water quality. However, these methods need a long period to work effectively (usually several months or years), the manipulation is time-consuming and arduous, and the cost is very high. Moreover, these techniques can not be used in super-eutrophication water to restore hydrophytes. Therefore, to remove HABs and to reduce nutrient levels (e.g. total phosphorous) quickly, safely, cost-effectively and at a very large scale is the key limit for the successful restoration of submerged macrophytes.

The reported techniques in removing HABs or cyanobacterial blooms can be classified into four categories: chemical algaecides, using bacteria and virus to control algal growth, harvesting algal cells by floating and flocculation. Chemical algaecides are often forbidden to be used in many countries, mainly because of their adverse effects on other organisms. The cultured bacteria and virus control method is presently not an applicable option, mainly because of unsolved problems with its safety and handling. The floatation is almost inapplicable to large natural waters because of the high cost. The flocculation includes chemical flocculation and clay flocculation. The application of commercially available flocculants (such as polyaluminum chloride and polyferric chloride) to natural waters is often rejected due to economic reasons and safety concerns (such as the damage of bioecological balance and the dying of plankton). Nowadays, a very promising and environmentally friendly way to do this is to use natural, nontoxic and inexpensive clays to flocculate and remove algal cells (Anderson, D. M., 1997. Nature, 388, 513-514. However, clay methods still have many substantial problems, such as too high loading, sediment re-suspension and anaerobic release of pollutants/nutrients, and ecological safety concerns, that prevent the method to be extensively used in practical HABs control especially in fresh water systems.

In the early stage of the clay techniques, inorganic acid, hydrogen peroxide, surfactants, and polyunsaturated fatty acids have been used to modify clays and to improve the flocculation efficiency and to reduce the clay loading. However, these modification methods do not bring a breakthrough in reducing the loading and cost and in improving the safety. Gang PAN et al developed a series of techniques to improve the efficiency of removing algal blooms in fresh water lakes using clay flocculation. In 1999 and 2001, PAN developed a method for simultaneously clearing up HABs and harnessing organic pollutants to promote the primary productivity in the sea (UK patent, GB2337749) and a technique for flocculating and removing HABs using sepiolite (PRC patent, CN1417136) respectively. In 2002, PAN proposed a new modification technology by using natural netting and bridging polymer material, which can turn most soils or clays into highly efficient flocculants to remove algae cells in freshwater, and this technique made it possible to use local clays, soils and sediments to control local cyanobacterial blooms in lakes. Details about this technique can be seen in following references: 1. Pan, G., Zhang, M. et al. Environmental Pollution, 141 (2): 195-200; 2. Zou, H. Pan, G. et al, Environmental Pollution, 141 (2): 201-205; 3. Pan, G. et al, Environmental Pollution, 141 (2): 206-212.

Although the above-mentioned techniques of using local soils to flocculate and remove algal cells have greatly reduced the loadings and the costs of the materials, a common problem with all clay methods still exists. The flocculated algal cells which settle down to the sediment can decompose and consume a great deal of oxygen, which make the bottom waters/sediment become anaerobic. This will make some pollutants and nutrients be gradually released into the water, which will lead to the break out of HABs again. In order to solve this problem in 2003, PAN developed a technique using modified clays which can combine phosphorus fixation, algae flocculation and reversing of anaerobic environment in the sediment (CN200310113305.5). Furthermore, PAN developed a new technique using lanthanum to modify clays in 2005, which could make phosphorus in sediments effectively and nonreversiblely fixated in the modified clays (CN200510063410.1). By this way, even when sediments re-suspended, the probability of phosphorus in sediments releasing into the waters can be reduced. The two techniques mentioned above made further progress in controlling secondary pollution of sediments after removing algae. However, the above mentioned phosphorus-fixation method is still a physical chemical approach. It is difficult to prove the long term ecological safety of such kind of methods. The problem may be solved if physical chemical methods can be developed in combination with an ecological approach.

So far, there has been no method for algal removal and water quality improvement using modified local soils/clays/sediments that are simultaneously used for restoring submerged macrophytes in the technical field of ecological restoration. In addition, there has been no technology which combines physicochemical method and ecological restoration to control eutrophication in the technique field of algae removal using clays. Moreover, no technology has been reported to prevent algae resuspension, deoxygenation and secondary pollution using submerged macrophytes that are restored by using modified local soils/clays.

SUMMARY OF INVENTION

The present invention is aimed to provide a composite material for quickly removing harmful algal blooms and turning them into submerged macrophytes and a physical-chemical-ecological combined method for improving water quality and enhancing the ecological restoration of eutrophication lakes using the above-mentioned material.

According to the present invention, the composite material mentioned above is a mixture of two functional materials: one can grow into submerged macrophytes, and the other is clays or modified local soil particles which can flocculate algae, inhibit phosphorus release from sediments and act as the carrier of other effective components (such as seeds, earthnuts, buds, and roots of submerged macrophytes).

According to an embodiment of the present invention, the modified local soil particles are local clays, sediments or soils modified by environmentally friendly natural organic polymers through netting and bridging.

The above-mentioned particle material can be loaded with oxygen-releasing compound and phosphorus-fixer, both of which can react with phosphorus.

The oxygen-releasing compound releases oxygen and enriches the surrounding environment with oxygen. The oxygen-releasing compound can be the mixture of zeolite and one or several of the listed chemicals: calcium peroxide, calcium percarbonate, magnesium peroxide and sodium percarbonate. The oxygen releasing compound/sediments ratio varies from 1:1 to 1:1000 depending on concrete conditions.

The above-mentioned phosphorus-fixation can be lanthanum compounds such as lanthanum chloride. The phosphorus fixer/clays ratio varies from 1:100 to 1:100000 depending on concrete conditions.

The above-mentioned environmentally friendly natural organic polymers can be chitosan, chitin and their corresponding derivatives The polymer/clays ratio varies from 1:10 to 1:10000 depending on concrete conditions.

The materials that can grow into submerged macrophytes can be the regenerative parts of the plants that adapt to eutrophication water and seasonal temperature conditions, including their seeds, earthnuts, roots and buds. The ratio of the material to grow into submerged macrophytes to the modified carrier varies from 1:1 to 1:10000000 depending on concrete conditions The seeding amount of seeds, earthnuts, buds, and roots of submerged macrophytes is about 0.2-0.25 kg per mu.

The submerged macrophytes can be *Vallisnerria spiralis* L, *Ceratophyllum demersum* L, *Myriophyllum Linn*. Sp, *Hydrilla verticillata Royle, Potamogeton crispus* L, *Vaillant ex* Linn, *Potamogeton malaianus, Myriophyllum spicatum* Linn, *Ranunculus kauffmannii, Naias marina*, and others that adapt to water quality, various sediment compositions, temperature and depth in the eutrophication water.

The material to grow into submerged macrophytes can be mixed with modified carrier directly or after budding pretreatment under certain temperature.

The invented composite material can rapidly and effectively remove algae, prevent secondary pollution and control eutrophication in the long run. The modified carrier (such as modified clays) can remove algae and turbidity and provide new environment for the seeds to burgeon and grow.

On the other hand, the invention also proposes a physical-chemical-ecological combined method for improving water quality and enhancing the ecological restoration of eutrophication lakes, which can simultaneously control HABs and eutrophication. By spraying the composite material to the lake surface, algae and turbidity can be removed through flocculation, and the planting process completed meanwhile. Therefore, the removal of algae, the improvement of water transparency, the seeding and growth of submerged macrophytes, the control for secondary pollution and eutrophication can be conducted with one operation, making the technique both an emergency measure and a permanent treatment.

BRIEF INTRODUCTION TO THE DRAWINGS

DETAILED DESCRIPTION OF THE PREFERRED EMBODIMENTS

Figure 1:
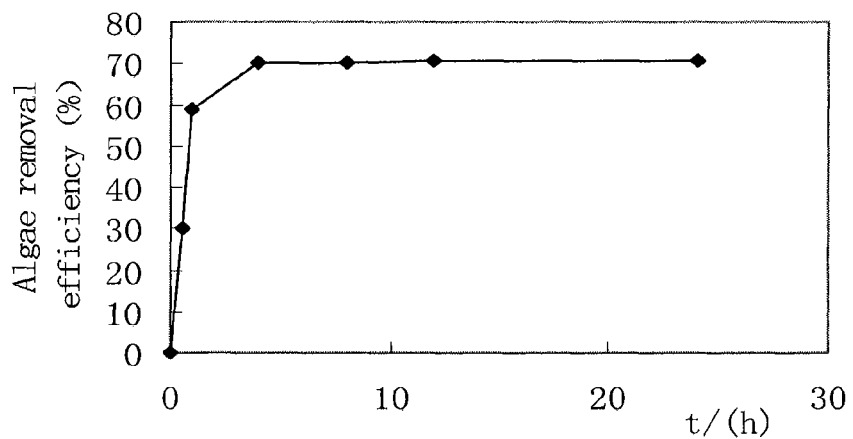
FIG. 1 shows the kinetics of algae removal using chitosan-modified clays in the first implementation case.

The present invention is aimed to provide a composite material which can rapidly and effectively remove algae and turn them into submerged macrophytes. To be specific, the invention provides a combined technique that can control the algal blooms and the eutrophication of natural water in the long term, because it can remove algae and turbidity, plant and restore submerged macrophytes, fix algae flocs in the sediment and turn them into submerged macrophytes using the composite material such as modified clays. To produce the composite material used in the present technique, the local lake sediments or soils, the environmentally friendly bridging and netting modifier and the seeds or roots of submerged macrophytes are mixed after certain pretreatment. With the composite material sprayed to the water surface, algae and turbidity can be effectively and rapidly removed, which greatly enhances water transparency and makes it possible for the seeds or roots to burgeon and grow in eutrophic water. The composite material turns algae and sediment or soil particles into massive flocs through bridging and netting which are difficult to break up, preventing the resuspension of flocs and the secondary pollution to a great extent. At the same time, the modified clays can create suitable environment at the bottom of lake for the budding and growth of submerged macrophytes. The present invention restores the submerged macrophytes, and they can greatly improve the structure of sediments and water quality in lakes, and change the surface property of sediments, which is helpful to the ecological restoration in eutrophic lakes. In other words, with this new technology of the present invention, harmful algae are firstly removed and water transparency enhanced so that submerged macrophytes can grow and fix the surplus nitrogen and phosphorus in sediments, which can both rapidly clear up harmful algae and control eutrophication in the long run.

The present invention provides a physical-chemical-ecological combined method for improving water quality and enhancing the ecological restoration of eutrophic lakes using above-mentioned material. To be detailed, by spraying the composite material made from the modified clays, soils or sediments and seeds or earthnuts, algae can be removed rapidly, water transparency improved greatly, and then the seeds, earthnuts, algae and modified soils can be settled down to the bottom of lakes, and turned into submerged macrophytes. Through a one-step mechanized operation, the composite material mentioned in the present invention can achieve short-term goals of rapidly and effectively removing algae as well as the long-term goals of fixing algae in sediments and the restoration of submerged macrophytes and control of secondary pollution and eutrophication.

The present invention effectively overcomes the disadvantages of previous algae removal techniques using clays that only remove algae floating on the water surface and cannot prevent the resuspension of sediments and algae flocs and secondary pollution, and at the same time it is ecologically safe with low cost and high stability in phosphorus fixation compared with chemical methods. The present invention also solves the problem that submerged macrophytes can not survive in eutrophic water through the traditional ecological restoration technique. The present invention can be used for clearing up the large-scale red tides and cyanobacteria blooms caused by eutrophication as well as controlling river pollution.

The present invention provides a combined technology of water quality improvement and ecology restoration. The technology can simultaneously remove algae rapidly and implement long-term restoration using submerged macrophytes, thus making it both an emergency measure and a permanent treatment. In detail, by spraying the composite material made from the modified clays, soils or sediments and seeds or earthnuts, algae can be removed rapidly, water transparency can be improved greatly, and algae turned into submerged macrophytes at water bottom.

As can be seen from above, the local soils become highly effective algae flocculants after being modified. The removal of HABs makes it possible for the seeds to grow, which might die and decay due to the lack of sunlight otherwise. Moreover, the submerged macrophytes can prevent the resuspension of algae flocs and implement long-term ecological restoration of eutrophic lakes.

The following examples are described in detail according to the present invention, in order to further illustrate certain embodiments of the invention, and are not limiting in nature.

Embodiment 1

Experimental objective: the algae removal and the ecological restoration of submerged macrophytes using chitosan-modified clays.

20 g soils particles collected from Chaohu lake (180 mesh), 1 g chitosan and 10 mg seeds after pretreatment are mixed and distilled water is added to prepare 1 L composite material. The experiments are conducted in 1 $m^3$ tanks simulating natural lake environment. There are 10-cm deep sediments and 90-cm deep natural lake water sampled from lakes with severe algal blooms. The experimental tanks are exposed to diurnal fluorescent light (12 hr on and 12 hr off, 166 $\mu w/cm^2$ at water surface). The experiment is conducted at constant temperature (25° C.). Waves are made artificially to simulate the effect of wind wave on the resuspension of sediments in lakes. The micro-aeration system simulates the water-air exchange at the surface, but does not influence the hydrodynamic status at the bottom. Natural lake water and algae used are collected from Chaohu Lake. The experiments are carried out in two tanks. One is treated with modified local soils and seeds are sowed in it (No. 4), and the other is used as control in which the seeds are sowed without algae removal (No. 3). The initial concentration of algae, Secchi depth, turbidity, DO in the surface, total phosphorus and orthophosphate concentration are $7 \times 10^9$ cells/L, 45 cm, 75 NTU, 7 mg/L, 0.3 mg/L and 0.02 mg/L, respectively. The composite material prepared previously is sprayed to the water surface of experimental Tank 4 but not in Tank 3. Meanwhile, the same amount of *Vallisneria spiralis* L seeds are sowed in both tanks. After algae removal in Tank 4, the water quality and submerged macrophytes growth are measured in both tanks.

Figure 2:
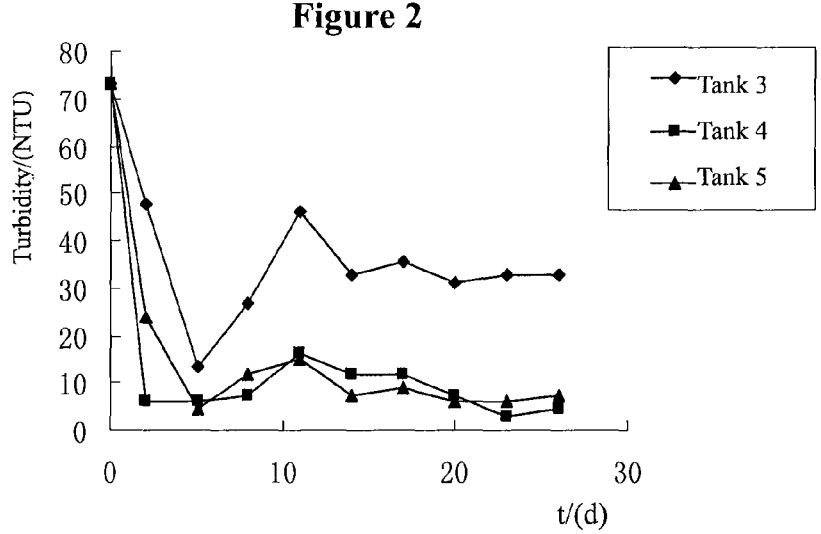
FIG. 2 shows the turbidity changes with time in the first two implementation cases.
Figure 3:
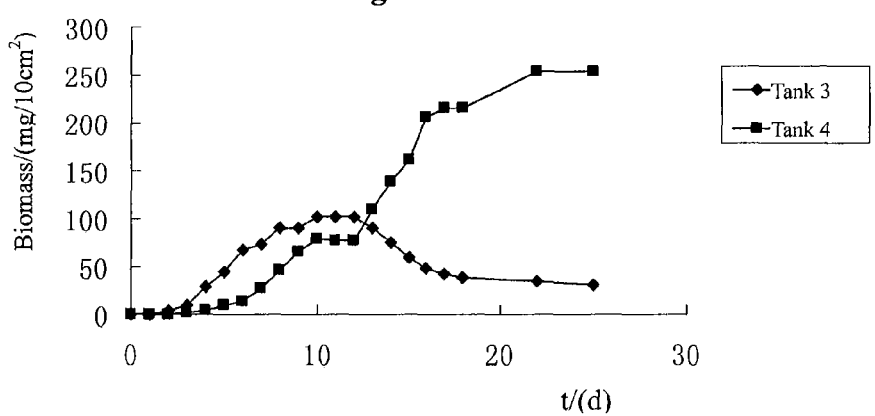
FIG. 3 shows the biomass changes with time in the first implementation case.
Figure 4:
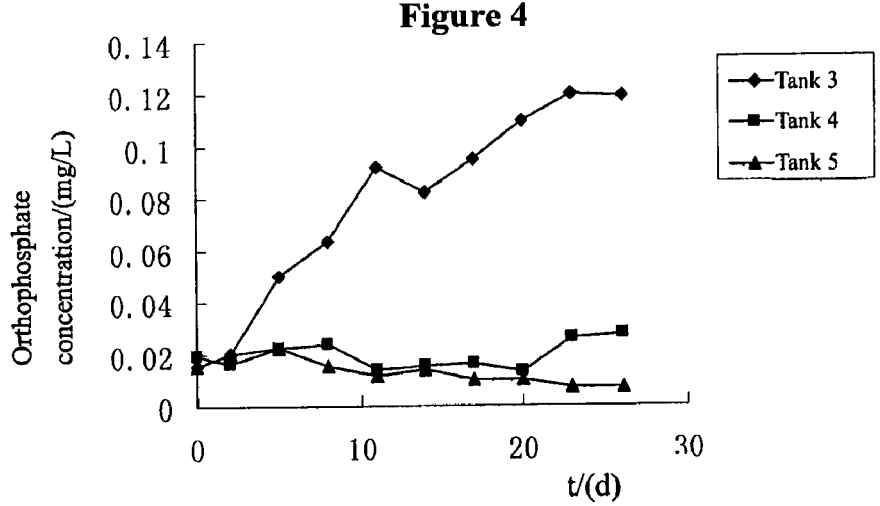
FIG. 4 shows the orthophosphate content changes with time in the first two implementation cases.

FIG. 1 shows the change of algae removal efficiency with time, which demonstrates that 70% of algae cells are removed within 5 hours after the addition of modified local soils. The turbidity decreases and transparency of water increases after algae removal using modified local soils (see FIG. 2, which compares the results in the two tanks). As shown in FIG. 3, *Vallisneria spiralis* L grow rapidly after 20 days in Tank 4, but those in Tank 3 almost die after 20 days. It is observed that during the experiment period the seeds can burgeon in both tanks, but the seedlings in Tank 3 can not lobulate further and die rapidly due to the shortage of sunlight, whereas the seedlings in Tank 4 lobulate 10 days after algae removal and grow well. FIG. 4 shows that the orthophosphate concentration in Tank 3 increases by six-fold while in Tank 4 it decreases. The above-mentioned results indicate that chitosan-modified clays can not only remove algae rapidly, but also make *Vallisneria spiralis* L to burgeon, root, lobulate and grow after the algae removal. In contrast, *Vallisneria spiralis* L can not grow without algae removal as in Tank 3 although the initial water quality is exactly the same as in Tank 4 before the experiment. More importantly, the composite material of modified soils effectively inhibit phosphorus release from sediments and secondary pollution.

The above-mentioned chitosan can be industrial grade. As an example of composite material preparation, firstly industrial grade chitosan is added to 1% HCl solution, and the solution is then diluted with distilled water after all chitosan is solved so as to prepare chitosan solution (the modifier). Clays are added to the chitosan solution to get modified clays. *Vallisneria spiralis* L seeds and *Potamogeton crispus* L seeds are added to the modified clays after certain budding pretreatment to get composite material. The *Vallisneria spiralis* L seeds/*Potamogeton crispus* L seeds/modified clays ratio is 2:2:10.

As another example of composite material preparation, firstly, carboxymethyl chitosan is added to distilled water to get carboxymethyl chitosan solution (the modifier). Secondly, clays are added to the carboxymethyl chitosan solution, and then the mixture is ultrasonic treated. Thirdly, sodium percarbonate and zeolite powder are added to the mixture to get modified clays. Finally, *Vallisneria spiralis* L seeds and *Potamogeton crispus* L seeds are added to the modified clays after certain budding pretreatment to get composite material. The *Vallisneria spiralis* L seeds/*Potamogeton crispus* L seeds/modified clays ratio is 1:1:10.

Embodiment 2

Experimental objective: the algae removal and the ecological restoration of submerged macrophytes at the same time using the composite material made from sepiolite.

Figure 5:
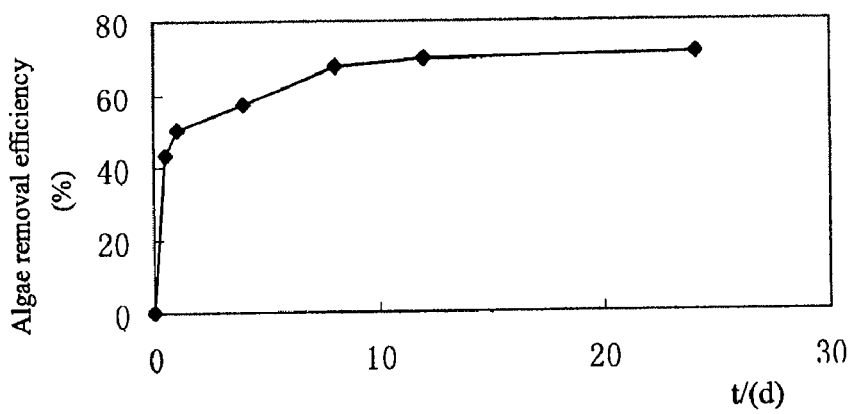
FIG. 5 shows the kinetics of algae removal using sepiolite in the second implementation case.
Figure 6:
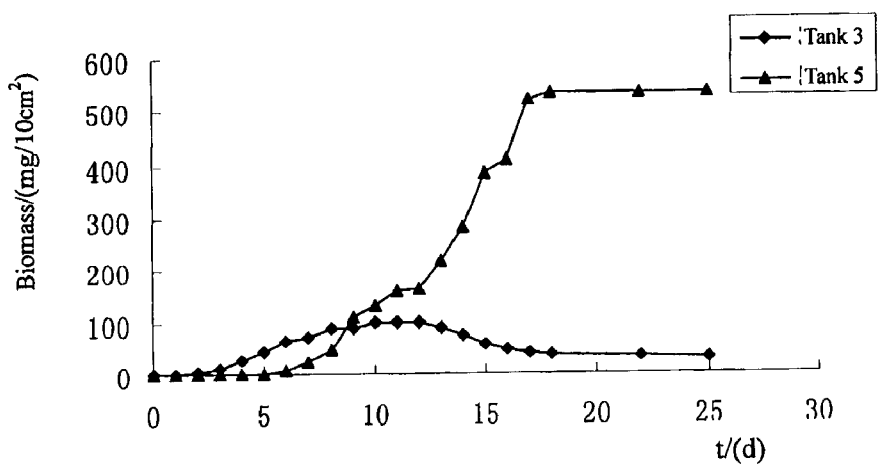
FIG. 6 shows the biomass changes with time in the second implementation case.

100 g sepiolite (180 mesh), 0.1 g chitosan and 10 mg seeds after pretreatment are mixed and distilled water is add to prepare 1 L composite material. The composite material is sprayed to Tank 5 for algae removal, and the experiment of algal removal and submerged macrophytes restoration is conducted under the same condition described in Implementation Case 1. FIG. 5 shows that 70% of algae cells are removed within 10 hours after the composite material is added. The biomass of *Vallisneria spiralis* L in Tank 5 is 500 times more than that of Tank 3, and the biomass of *Vallisneria spiralis* L is also more than two times that of Tank 4 in implementary case 1 (FIG. 6). Moreover, the composite material made from sepiolite also can inhibit the phosphorus release from sediments (FIG. 4).

The invention claimed is:

1. A composite material for removing HABs and turning them into submerged macrophytes, comprising a first functional material and a second functional material, wherein the first functional material comprises a material for growing submerged macrophytes, and wherein the second functional material comprises clays or modified local soil particles which can flocculate algae, inhibit phosphorus release from sediments, and carry and sink the first functional material for growing submerged macrophytes.

2. The composite material according to claim 1, wherein the modified local soil particles comprise one or more of clays, sediments, and soils, wherein the one or more of clays, sediments, and soils are modified by a natural organic polymer through bridging and netting.

3. The composite material according to claim 2, wherein the modified local soil particles are loaded with a phosphorus fixer, which can react with phosphorus.

4. The composite material according to claim 3, wherein the phosphorus fixer comprises a lanthanum compound, wherein the ratio of the lanthanum compound to the second functional material is in a range of 1:100 to 1:100000.

5. The composite material according to claim 2, wherein the natural organic polymer is one of chitosan, chitin, and their corresponding derivatives, wherein the ratio of the natural organic polymer to the second functional material is in a range of 1:10 to 1:10000.

6. The composite material according to claim 1, wherein the modified local soil particles are loaded with an oxygen-releasing compound.

7. The composite material according to claim 6, wherein the oxygen-releasing compound comprises a mixture of zeolite and at least one of calcium peroxide, calcium percarbonate, magnesium peroxide, and sodium percarbonate, wherein the ratio of the oxygen-releasing compound to the second functional material is in a range of 1:1 to 1:1000.

8. The composite material according to claim 1, wherein the material for growing submerged macrophytes comprises regenerative parts of the submerged macrophytes adapted to eutrophic water and seasonal temperature conditions, including seeds, earthnuts, roots and buds, wherein the ratio of the material for growing submerged macrophytes to the second functional material is in a range of 1:1 to 1:10000000.

9. The composite material according to claim 8, wherein the submerged macrophytes comprise one of *Vallisnerria spiralis* L, *Ceratophyllum demersum* L, *Myriophyllum* Linn. Sp, *Hydrilla verticillata* Royle, *Potamogeton crispus* L, *Valliant* ex Linn, *Potamogeton malaianus*, *Myriophyllum spicatum* Linn, *Ranunculus kauffmannii*, *Naias marina*, and others that adapt to water quality, various sediment compositions, temperature and depth in the eutrophication water.

10. The composite material according to claim 1, wherein the first functional material is mixed with the second functional material directly or after some treatment of budding in water.

11. A method for improving natural water quality and enhancing ecological restoration, comprising ejecting to the lake surface a composite material, wherein the composite material comprises a first functional material and a second functional material, wherein the first functional material comprises a material for growing submerged macrophytes, and wherein the second functional material comprises clays or modified local soil particles which can flocculate algae, inhibit phosphorus release from sediments, and carry and sink the first functional material for growing submerged macrophytes.

12. A method for improving natural water quality and enhancing ecological restoration, comprising spraying to the lake surface a composite material, wherein the composite material comprises a first functional material and a second functional material, wherein the first functional material comprises a material for growing submerged macrophytes, and wherein the second functional material comprises clays or modified local soil particles which can flocculate algae, inhibit phosphorus release from sediments, and carry and sink the first functional material for growing submerged macrophytes.

* * * * *